(12) United States Patent
Kreuzer

(10) Patent No.: US 7,026,015 B2
(45) Date of Patent: Apr. 11, 2006

(54) DEVICE AND METHOD FOR THE SURFACE TREATMENT OF WORKPIECES

(75) Inventor: Bernd Kreuzer, Lauterbach-Maar (DE)

(73) Assignee: ABB Technology FLB Aktiebolag, Stockholm (SE)

( * ) Notice: Subject to any disclaimer, the term of this patent is extended or adjusted under 35 U.S.C. 154(b) by 114 days.

(21) Appl. No.: 10/400,721

(22) Filed: Mar. 27, 2003

(65) Prior Publication Data

US 2003/0213429 A1    Nov. 20, 2003

Related U.S. Application Data

(63) Continuation of application No. PCT/EP01/09188, filed on Sep. 27, 2000.

(30) Foreign Application Priority Data

Sep. 27, 2000  (DE) ................ 100 47 968

(51) Int. Cl.
*B05D 1/02*    (2006.01)
(52) U.S. Cl. ...................... 427/425; 118/423
(58) Field of Classification Search ........... 118/423, 118/426, 500, 320, 314, 52, 416, 66; 427/240, 427/346, 425, 435; 104/94, 243; 105/155; 198/377.02, 377.03
See application file for complete search history.

(56) References Cited

U.S. PATENT DOCUMENTS

| 2,972,403 | A | * | 2/1961 | Barton .................... 134/76 |
| 5,110,440 | A | * | 5/1992 | Case ..................... 427/232 |
| 6,419,983 | B1 | * | 7/2002 | Kreuzer .................. 427/242 |
| 6,706,117 | B1 | * | 3/2004 | Ehrenleitner et al. ....... 118/423 |
| 6,746,720 | B1 | * | 6/2004 | Nishida et al. .......... 427/430.1 |

FOREIGN PATENT DOCUMENTS

| DE | 196 41 048 | 4/1998 |
| GB | 2229381 | 9/1990 |

* cited by examiner

*Primary Examiner*—Brenda A. Lamb
(74) *Attorney, Agent, or Firm*—Dilworth & Barrese LLP

(57) ABSTRACT

The invention relates to a device for the surface treatment of workpieces (12) such as vehicle bodies. One such device has a plurality of successive treatment stations (1–9), a guiding system (16, 17) having a first guiding section (16) extending in the region of the treatment stations (1–9), and a plurality of rotational mounts (13) which can move individually on said guiding system (16, 17). Each rotational mount (13) has a holding device (14) for at least one workpiece (12) and a rotational axis (15) which is arranged in such a way that the workpeice (12) in the holding device (14) can be brought into, or taken out of, one of the treatment stations (1–9) by rotation about the rotational axis (15).

19 Claims, 4 Drawing Sheets

DEVICE AND METHOD FOR THE SURFACE TREATMENT OF WORKPIECES

Figure 1:
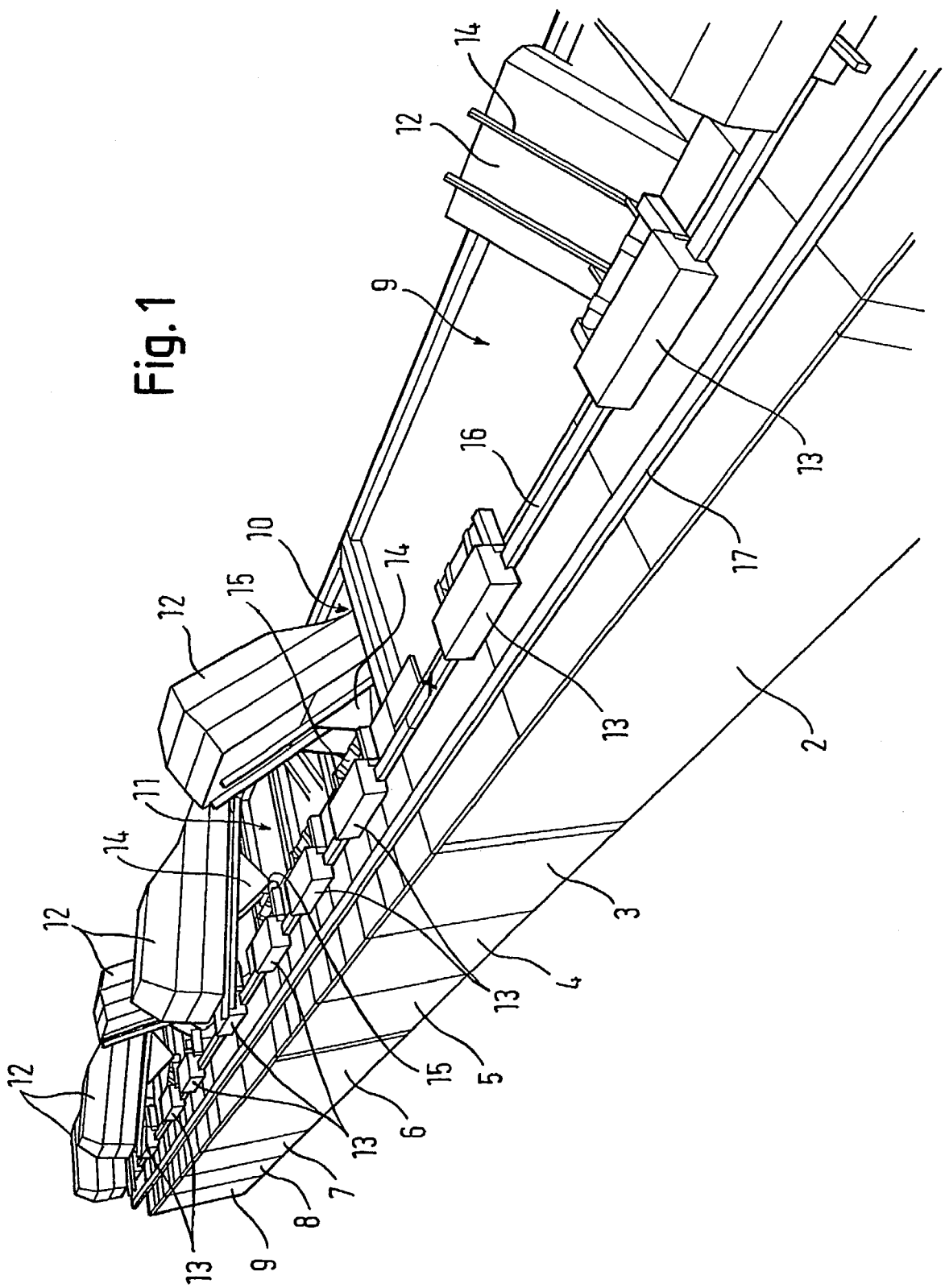

This is a continuation of copending application Ser. No. PCT/EP01/09188 filed Sep. 27, 2000.

TECHNICAL FIELD

The invention relates to a device for the surface treatment of workpieces such as vehicle bodies. Such a device comprises a plurality of successive treatment stations and a guiding system comprising a first guiding section extending in the region of the treatment stations. Special rotational mounts can move thereon. Further, the invention relates to a method for the surface treatment of workpieces, in particzlar vehicle bodies.

PRIOR ART

Hitherto known devices for the surface treatment of workpieces such as vehicle bodies, e.g. in dipping baths or treatment cabins may be differentiated in continuously conveying devices and discontinuously conveying devices. In continuously conveying devices, the bodies are e.g. fastened in a suspension gear. As a rule, the suspension gears are lowered into the dipping baths by means of a chain drive, drawn through the dipping baths and again lifted therefrom. In accordance with the desired process time and the capacity of the system, the dipping bath length and the conveying speed are adapted. Such a system is for example described in GB 1 434 348. A further continuously conveying device is, for example, known from DE 196 41 048 A1. In this system, a plurality of rotational mounts are moved at a fixed distance from each other at a constant speed by means of a common conveying device above a plurality of treatment basins. In case of moving rotational mounts with vehicle bodies disposed thereon, the vehicle bodies are brought into or taken out of the treatment basins by a rotary motion which is effected by a lever system or by a motor provided therefore.

In the discontinuously conveying systems, also designated clock systems, the bodies are moved on object carriers over the dipping basins and stopped there. The bodies are dipped into the treatment bath by lifting devices, such as overlifting systems or rotational devices, and lifted or turned out after the end of the process time. In connection therewith, the DE 43 04 145 C1 is cited as an example. The GB 2 229 381 A may also be assigned to this category of systems. Clock systems may only be used for small production rates since the capacity of the system dependes on the desired process time and is thus considerably limited.

REPRESENTATION OF THE INVENTION

The invention is based on the idea to provide a combination of continuously and discontinuously conveying systems for the first time. So, a system was created for the first time, in which a plurality of rotational mounts which can move individually on a common guiding system comprising one holding device each for at least one workpiece. The rotational mounts have a rotational axis which is arranged in such a way that at least one workpiece attached to the holding device of a rotational mount can be brought into or taken out of the treatment station by means of rotation about this rotational axis. A complete bringing-in of the workpiece into the treatment station or taking it out therefrom is preferred. A treatment station may e.g. be a dipping basin with a treatment liquid. A cabin for performing a coating process, such as varnishing, also represents a treatment station as defined by the invention. It goes without saying that the term treatment station also subsumes any other type of cabin or basin, if any treatment of a part of the workpiece or of the entire workpiece is to the broadest extent performed therein. A treatment along these lines may for example also be a washing procedure. In this respect, reference is generally made to the prior art, in which various treatment stations are described which are known to the skilled person, (such as dip phosphatizing, pre-treatment for dip coating, dip coating, powder coating processes, wet coating, drying processes, etc.)

As compared with an overlifting system or a discontinuously conveying system, a system according to the invention achieves a higher capacity. As compared with the overlifting system according to the prior art, wherein maximally 24 bodies per hour can be treated, in an overlifting system according to the invention up to 30 bodies per hour can be treated which represents a capacity increase of remarkably 25%. Contrary to the prior art, such as an overlifting system, the necessary conveying technique is minimized in the system of the invention, and no additional working stock, such as conveying cages, is needed. Further, it is advantageous that no rotatable parts are principally brought into the treatment stations, so that the contamination of the moving parts is also extremely low. However, the greatest advantage can be seen in that travelling over the treatment stations is also possible in the system according to the invention, whereby for example aluminium bodies and zinc-plated vehicle bodies may also be treated in the same process line in a mixed process. Further, it is for the first time possible to provide different moving speeds in the treatment stations, since individually moveable rotational mounts are present for the first time, that is, each rotational mount can be moved independently of the other rotational mounts. It is a special advantage that e.g. only one single empty rotational mount must be returned to a feeding or loading station, which may additionally be done at a considerably higher speed than hitherto. Previously it-has been necessary to always return a greater number of empty units, which was a cost- and maintenance-intensive procedure.

Optimally, each rotational mount has an own drive for moving the rotational mount along the guiding system. The recources required for this purpose, preferably current, may be taken from a corresponding supply line within or in the region of the conveying device. It would however also be conceivable to provide a type of linear drive which allows an individual control of the individual rotational mounts. Alternatively, it would also be conceivable to provide a rotating cable or a rotating chain to which the individual rotational mounts may be coupled and decoupled.

It would also be conceivable that each rotational mount has an own power accumulator, e.g. a battery, a compressed-air storage or a flying-wheel storage. In this case, the rotational mount would contain the energy for one or a plurality of turns in itself. The power accumulator could be recharged when the rotational mounts return.

As in the prior art initially described, it is possible also here to effect the rotation about the rotational axis by a lever system. In order to effect the rotary motion, it is however preferred to provide an own rotary drive on each rotational mount, such as an electric motor.

An extremely inexpensive and advantageous embodiment comprises a common drive for moving the rotational mount as well as for carrying out the rotary motion. In accordance with the switching of a gear, the rotary motion or the advance of the rotational mount along the guiding system is performed by this drive, preferably an electric motor.

An extremely simple and inexpensive variant provides that the guiding system is composed of two sections: a first guiding section, which runs along the treatment stations, and a second guiding section, which allows a return of the rotational mount with the second section and represents a closed loop. It is self-evidently also possible to separate these two sections from each other and to move the rotational mounts from one section to the other by suitable return-travel systems.

The guiding system may include various embodiments. Optimally, and in view of the costs also extremely advantageously, the guiding system is designed as one rail or a plurality of rails. So, two opposite rails may form the guiding system. However, a monorail path only may also be provided.

Preferred is a combination of a system according to the invention with a feeding and loading device and a discharge device. The loading device is designed in a known manner so that the workpieces may be attached to a holding device of a rotational mount. The discharge device is designed so that the workpieces treated may be removed from the holding devices of the rotational mounts and transmitted to other conveying devices or treatment stations.

Optimally, the second guiding section of the guiding system for returning the rotational mounts from a discharge region to a loading region of the system runs above the treatment station. This allows to save lateral space. In addition to this, it is also possible to couple already existing conveying devices, such as rails, with the new technology. In accordance with the local conditions, it is self-evidently, also possible to have the returning section realized below or laterally from the treatment stations.

In order to shorten the entire system, the rotational axes of the rotational mounts are preferably arranged in parallel to the moving direction of the rotational mounts. Therein, the largest dimension of the workpieces is preferably aligned vertically to the rotational axes. Turning in and turning out of the workpieces is performed vertically to the longitudinal extension of the guiding system. It is also possible to arrange the rotational axes vertically to the direction of travel of the rotational mounts.

The invention further relates to a method for the surface treatment of workpieces such as e.g. vehicle bodies. According to the invention, moveable rotational mounts each having one holding device for at least one workpiece and a rotational axis are independently of each other moved on a guiding system to a desired position on a plurality of successive treatment stations. In the corresponding position or also during the travel of the rotational mounts a turn about the rotational axis of a rotational mount is carried out, whereby one or a plurality of workpieces are brought into a treatment station or moved out of it.

Various dwell periods in the treatment stations may be obtained by various travel speeds of the individual rotational mounts. Further, the return at a higher speed is also possible, so that an empty rotational mount may again be loaded very quickly with a new workpiece. The individual travel of the rotational mounts is preferably performed by means of an own drive, as was in detail explained above.

When the rotational mounts are returned to a loading station, the rotational mounts with the holding devices are optimally disposed such that few space is occupied in the lateral direction. If a return of the rotational mounts is provided above the treatment station, a holding device may for example be expedient which is turned approximately by 90°.

SHORT DESCRIPTION OF THE DRAWINGS

Figure 2:
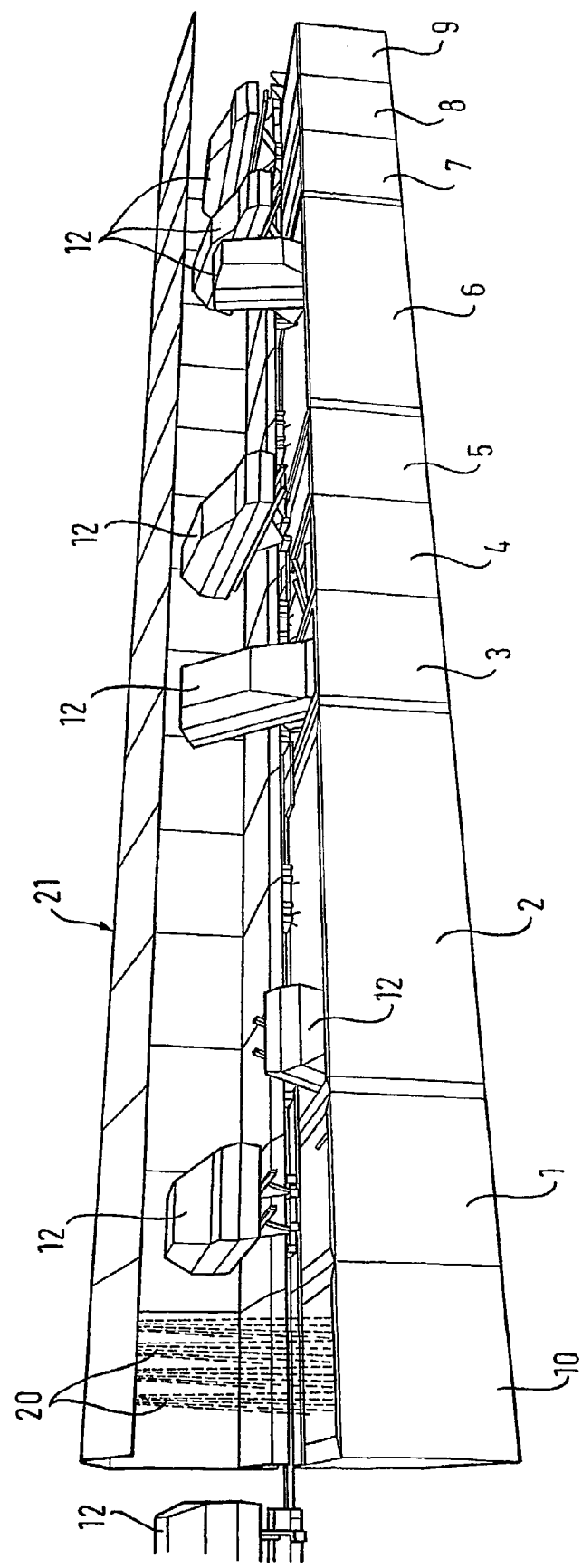
Figure 3:
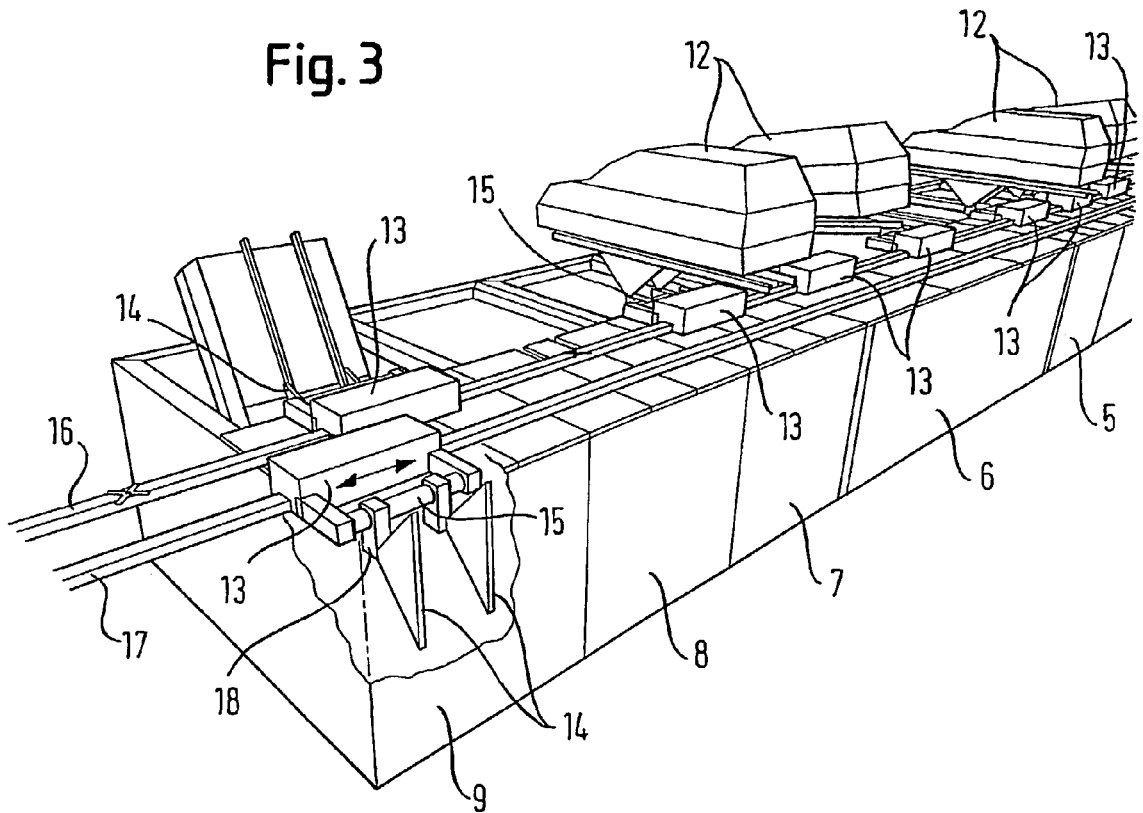
Figure 4:
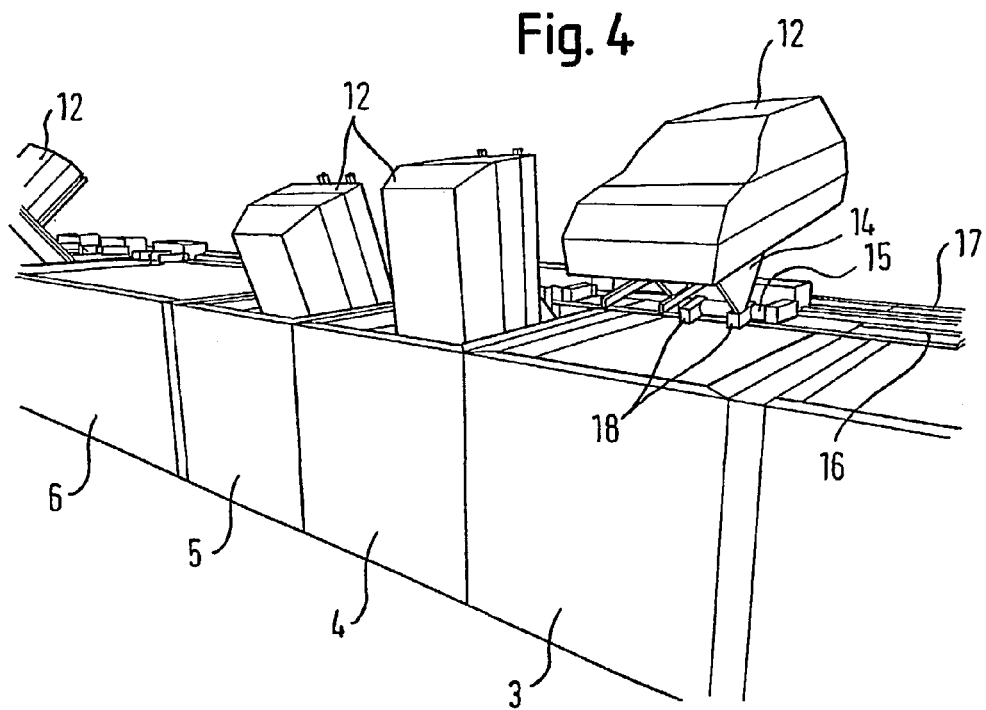
Figure 5:
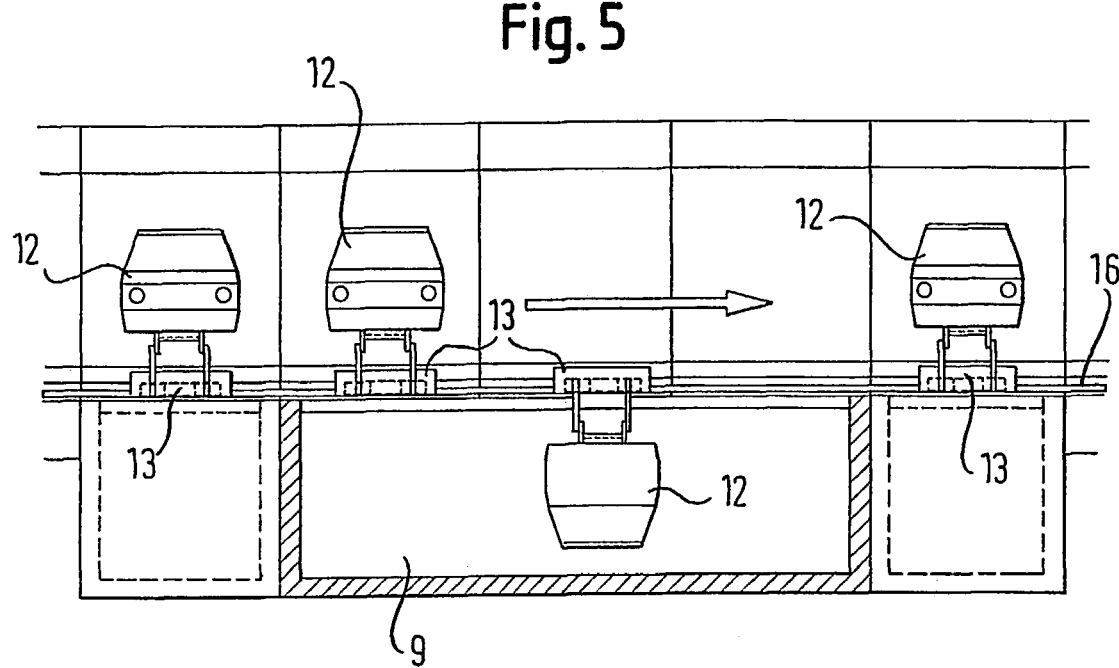
Figure 6:
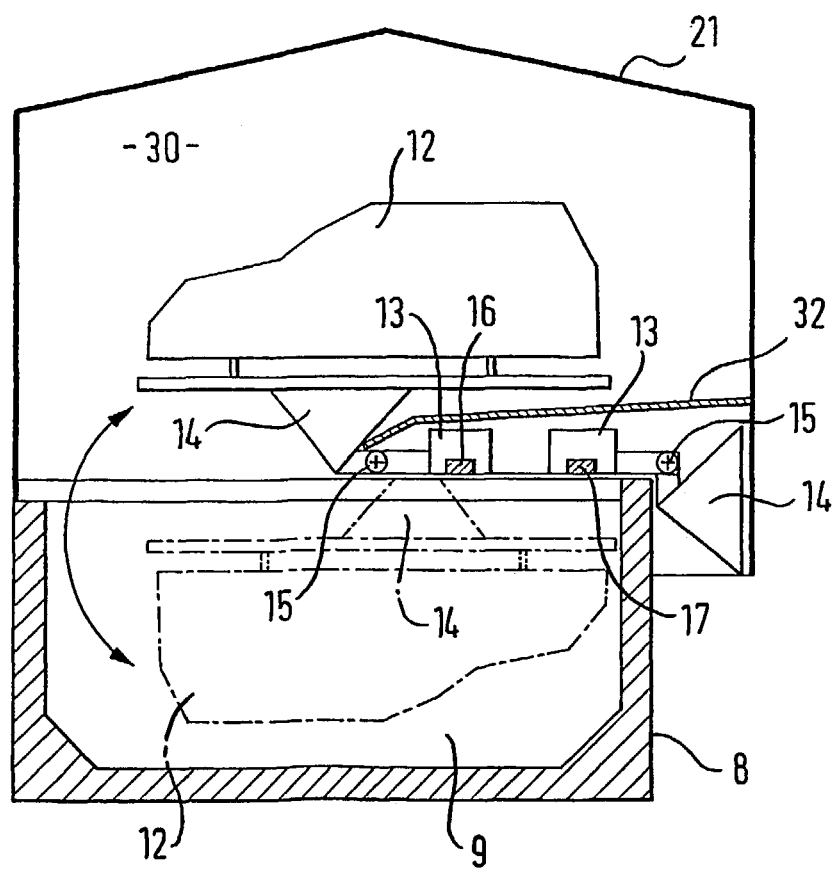

An embodiment of the invention is described in the following for a better understanding with reference to the accompanying drawings. Therein represent:

FIG. 1 a perspective diagonal view of the front of a system according to the invention, FIG. 2 a further perspective view of a system according to the invention, seen diagonally towards the front, FIG. 3 a further perspective view of a detail of a system of the invention according to FIG. 1, FIG. 4 a further perspective view of the detail of the system of the invention according to FIG. 3, seen from the other side, FIG. 5 a schematic longitudinal section through an embodiment according to the invention and FIG. 6 a schematic cross section through an embodiment of the invention according to FIG. 2.

DESCRIPTION OF A PREFERRED EMBODIMENT OF THE INVENTION

An embodiment of the system for the surface treatment of vehicle bodies according to the invention is described with reference to FIGS. 1 to 6. As may be taken from the various perspective views according to FIGS. 1 to 4, a plurality of treatment basins 1 to 9 are arranged one behind the other. The basins shown therein are filled with various treatment liquids. So, in one treatment basin a dip coating is for example performed, the other basins contain special, per se known treatment liquids for a pretreatment or an aftertreatment. A first guiding section 16 of a guiding system extends above the treatment basins 1 to 9. A second guiding section 17 extends in parallel thereto on the side of the edges of the treatment basins 1 to 9 which forms together with the first section 16 of the guiding system a closed loop. The closed loop may in particular be taken from FIG. 1.

The guiding sections 16 and 17 consist of a guiding rail on which a plurality of rotational mounts 13 are moveably guided. Each rotational mount 13 comprises a holding device 14 which may be turned relatively to the rotational mount 13 about a rotational axis 15. The rotational axes 15 of the rotational mounts 13 are aligned in parallel relative to the guiding sections 16, 17 of the guiding system in the embodiment shown. Vehicle bodies are 12 are detachably fastened on the holding devices 14 directly or indirectly by intermediate switching of so-called skids. A body 12 each is fastened to a rotational mount 13 in the embodiment shown. However, a plurality of bodies 12 may self-evidently also be attached to one single rotational mount 13 side by side or one behind the other.

According to the representation of FIG. 2, a treatment station 10 is present at the beginning of the treatment basins 1 to 9, into which cleaning water may be sprayed from above over the treated vehicle bodies 12 on the rotational mounts 13, so as to clean the bodies 12 still to be treated from contaminations from previous treatment steps.

As may be taken from the representation according to FIG. 3, a movable rotational mount 13 is equipped with two protrusions, at the ends of which a rotational axis 15 is supported. Hinged arms 18 are attached with torsional strength to the rotational axis, by which the holding devices 14 for vehicle bodies are fastened to the rotational mount 13.

The vehicle bodies 12 are detachably mounted on the holding devices 14 to the rotational mounts 13 by fastening devices which are not shown.

As may be taken from the various perspective views, a vehicle body 12 may be partially or completely dipped into a treatment liquid in a treatment basin 1 to 9 or may again be led out of it, e.g. by a turn of 90° or 180° about the rotational axis 15.

As may be taken from the representation of FIG. 2 as well as FIG. 6, the whole system is encased (see the roof 21), so that a closed cabin 30 is created which may be taken from the cross section of FIG. 6. The two guiding sections 16, 17 are covered by a protective cover 32. The protective cover 32 arrives at the rotational axis 15, so that liquid dripping from the vehicle bodies 12 mounted above will drop onto the protective cover 32 and in the treatment basin or will previously be catched.

As may be seen in FIG. 6, the holding device 14 is slanted at an angle of 90° when the rotational mounts are returned, whereby lateral space is saved. The folded down holding devices 14 of the rotational mount together with the rotational mounts 13 are simultaneously protected against the dripping of liquid, this also applies in case of a return below the protective cover 32.

The system shown is operated as follows. The vehicle bodies 12 are transferred to an empty rotational mount 13 made available by a loading device (not shown) before the treatment station 1 and are detachably fastened thereto by means of the holding device 14. As was explained above, this may be performed directly or by intermediately switching a so-called skid. Then, the corresponding rotational mount 13 is moved to the desired position over a treatment basin 1 to 9 and the vehicle body 12 is dipped into the corresponding treatment liquid in one of the treatment basins 1 to 9 by turning the rotational axis about 180°. The vehicle body 12 is led out by a turn in the opposite direction.

The rotational mount 13 is further moved to the next treatment station 1 to 9 at any speed and the vehicle body 12 is again dipped into the liquid while being turned. If a longer dwell period is desired, a continuous further travel of the rotational mount 13 may be performed while the body 12 remains dipped. The vehicle body 12 is taken away from the rotational mount 13 at the end of the treatment stations 1 to 9 and the rotational mount 13 which is now empty is again led back on the section 17 of the guiding system to the loading device in a quick return motion.

The rotary motion may at any time be stopped for a shorter dripping time in order to keep the vehicle body 12 at an angle which is favorable for the dripping process, e.g. an angle of approximately 30° through 70°.

It is self-evidently also possible to treat a plurality of vehicle bodies 12 in a long treatment basin at the same time. This allows that long process times may also be realized in a quasi continuous process, when it is looked at it from a local aspect. As was initially explained, the rotational mounts 13 may have separate drives, such as electric motors, for the travel of the rotational mounts and for carrying out the rotary motions of the holding devices 14. However, mechanical solutions are also conceivable, wherein the rotational mounts 13 may be coupled to a continuously circulating cable or a chain or coupled out therefrom and are thereby advanced. When in a coupled-out condition, the cable or the chain motion could be used as a drive for the rotational mounts 13.

It would for example also be conceivable to provide a treatment station which does not contain treatment liquid but which has so-called spray rings. The vehicle bodies 12 could then be moved through this treatment station by one or a plurality of turning-in and turning-out movements, whereby a partial or complete spraying with the desired treatment liquid or a paint is performed.

The treatment stations mentioned here are arranged below the guiding system 16, 17. If no liquids are used, individual treatment stations may also be positioned above or laterally of the guiding system 16, 17, such as spraying cabins or the like.

What is claimed is:

1. System for the surface treatment of workpieces (12), comprising:
    a plurality of successive treatment stations (1 to 9),
    a guiding system having a first guiding section (16) disposed in the region of the treatment stations (1 to 9), and
    a plurality of rotational mounts (13) which can move individually on the guiding section (16), each of which is provided with a holding device (14) for at least one workpiece (12) and which has a rotational axis (15) extending parallel to the direction of movement of workpieces (12), and arranged
    such that the workpiece (12) can be brought into one of the treatment stations (1 to 9) and moved out of it by turning about the rotational axis (15).

2. System according to claim 1, characterized in that each rotational mount (13) is equipped with its own drive for moving the rotational mount (13) along the guiding section (16).

3. System according to claim 2, characterized in that each rotational mount (13) is equipped with its own drive for performing the turn about the rotational axis (15).

4. System according to claim 2, characterized in that the guiding system has a second guiding section (17) which forms a closed loop with the first guiding section (16).

5. System according to claim 1, characterized in that each rotational mount (13) is equipped with its own drive for performing the turn about the rotational axis (15).

6. System according to claim 1, characterized in that each rotational mount (13) has a drive which may optionally be used by a switching device to move the rotational mount (13) along the guiding section (16) or for carrying out the turn about the rotational axis (15).

7. System according to claim 1, characterized in that the guiding system has a second guiding section (17) which forms a closed loop with the first guiding section (16).

8. System according to claim 7, characterized in that the second guiding section (17) of the guiding system for returning the rotational mounts (13) runs from an output region to an input region of the system above, below or laterally to the treatment stations (1 to 9).

9. System according to claim 1, characterized in that the guiding system is formed as a rail (16).

10. System according to claim 1, characterized in that each rotational mount (13) has a lever arm coupled with the rotational axis (15) which interacts with a stationary lever guidance such that the rotary motion is effected by a longitudinal travel of the rotational mount (13) in the guiding section (16).

11. System according to claim 1, characterized in that a feeding device, by which the workpieces (12) may be mounted on the rotational mounts (13), and a take-up device are present, by which the treated workpieces (12) may be taken out from the rotational mounts (13).

12. System according to claim 1, characterized in that the rotational mounts (13) are equipped with a power accumulator which stores the energy required for driving the rotational mounts (13).

13. Method for the surface treatment of the workpieces (12) in a system for the surface treatment of workpieces (12) according to claim 1, comprising the steps of
providing the system for the surface treatment of workpieces (12) according to claim 1; moving the rotational mounts (13) independently of each other to the desired position on a plurality of successive treatment stations (1 to 9), and
bringing the at least one workpiece (12) into a treatment station (1 to 9) or moved out of it by turning the rotational mount (13) about the rotational axis (15) during the movement or after standstill of the rotational mount (13).

14. Method for the surface treatment of workpieces (12), comprising the steps of
providing moveable rotational mounts (13) each have one holding device (14) for at least one workpiece (12) and a rotational axis (15) extending parallel to the direction of movement of workpieces (12),
moving said rotational mounts independently from one another to a desired position on a plurality of successive treatment stations (1 to 9), and
bringing the at least one workpiece (12) is brought into a treatment station (1 to 9) or moved out of it by turning a rotational mount (13) about the rotational axis (15) during the movement or after standstill of the rotational mount (13),
wherein the rotational mounts (13) are moved on a guiding system (16, 17) at various speeds.

15. Method according to claim 14, characterized in that the rotational mounts (13) loaded with workpieces (12) are moved above the treatment stations (1 to 9) at a lower speed as compared with the speed when the rotational mounts (13) are returned to a loading station not being loaded with workpieces (12).

16. Method according to claim 14, characterized in that the rotational mounts (13) are moved on the guiding system (16, 17) by their own drives.

17. Method for the surface treatment of workpieces (12), comprising the steps of
providing moveable rotational mounts (13) each have one holding device (14) for at least one workpiece (12) and a rotational axis (15) extending parallel to the direction of movement of workpieces (12),
moving said rotational mounts independently from one another to a desired position on a plurality of successive treatment stations (1 to 9), and
bringing the at least one workpiece (12) into a treatment station (1 to 9) or moved out of it by turning a rotational mount (13) about the rotational axis (15) during the movement or after standstill of the rotational mount (13),
characterized in that the rotational mounts (13) loaded with workpieces (12) are moved above the treatment stations (1 to 9) at a lower speed as compared with the speed when the rotational mounts (13) are returned to a loading station not being loaded with workpieces (12).

18. Method according to claim 17, characterized in that the rotational mounts (13) are moved on a guiding system (16, 17) by their own drives.

19. Method for the surface treatment of workpieces (12), comprising the steps of
providing moveable rotational mounts (13) each have one holding device (14) for at least one workpiece (12) and a rotational axis (15) extending parallel to the direction of movement of the workpieces (12),
moving said rotational mounts independently from one another to a desired position on a plurality of successive treatment stations (1 to 9), and
the at least one workpiece (12) into a treatment station (1 to 9) or moved out of it by turning a rotational mount (13) about the rotational axis (15) during the movement or after standstill of the rotational mount (13),
characterized in that the rotational mounts (13) are moved on a guiding system (16, 17) by their own drives.

* * * * *